Patented Dec. 5, 1933

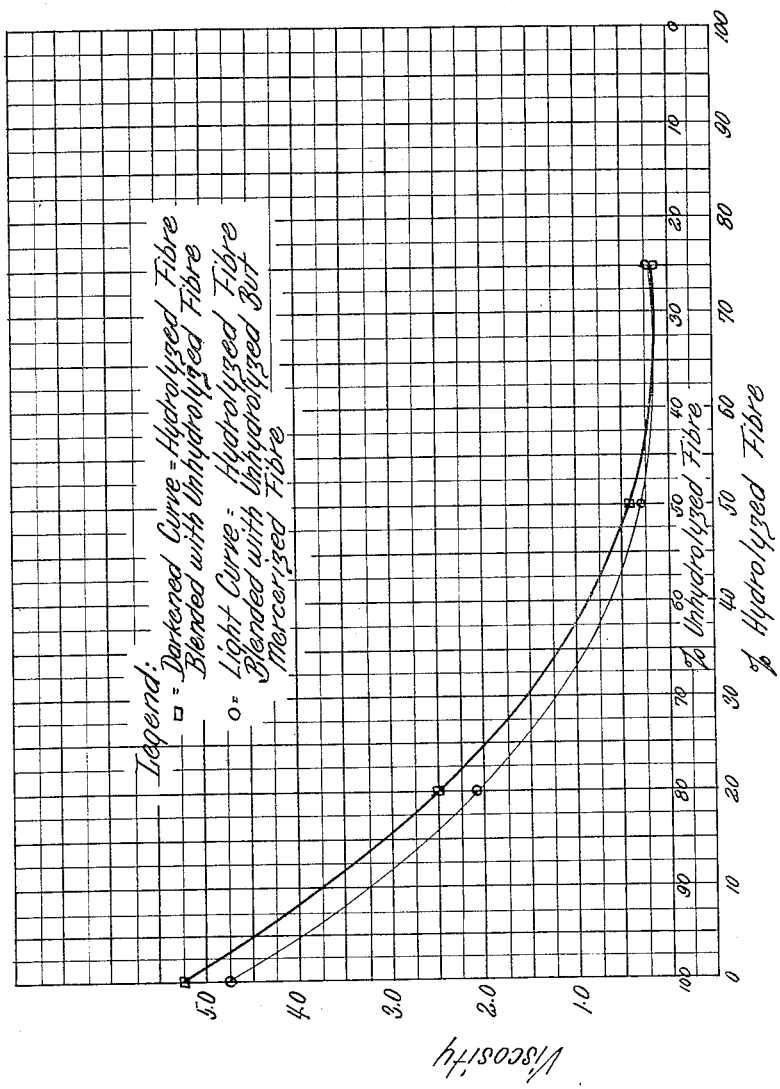

1,938,299

UNITED STATES PATENT OFFICE 1,938,299

CELLULOSE ESTER MANUFACTURE AND COMPOSITION THEREFOR

George A. Richter, Berlin, N. H., assignor to Brown Company, Berlin, N. H., a corporation of Maine Application September 23, 1930
Serial No. 483,790

13 Claims. (Cl. 260—100)

This invention relates to cellulose ester manufacture and to compositions of cellulose fiber more particularly intended for conversion into cellulose esters, such as nitrate and xanthate.

In the preparation of some cellulose esters, such as the nitrate or xanthate, it is desirable that the cellulose fiber used as the raw material be of low solution viscosity, by which it is meant that the esters preparable therefrom, when treated with suitable solvent medium, form solutions of low viscosity. There are various methods of reducing the solution viscosity of cellulose fiber, but some of the best ones, in the sense that they reduce the solution viscosity of the fiber drastically, cause serious physical and chemical injury to the fiber. For instance, a sharp reduction of the solution viscosity of cellulose fiber may be effected by treating the fiber with a solution of acid, such as hydrochloric or sulphuric, or solutions of oxidizing agents, such as hypochlorite or permanganate, but in such cases the fiber may suffer a drastic cut in its alpha cellulose content and a transformation into a powdery condition. The resulting fiber while convertible into cellulose esters, such as nitrate or xanthate, capable of forming solutions of low viscosity, nevertheless is apt to be unsatisfactory from that standpoint that artificial silks, films or lacquers produced from such solutions have poor physical properties. Again, the powdery fiber cannot be conditioned to advantage for conversion into esters. For instance, its shredding is accompanied by the generation of much dust; its formation into thick sheets results in products of high density through which converting chemicals can penetrate only with difficulty. Such sheets are so fragile, moreover, that they break easily; and thin sheets or papers are even more lacking in tenacity, strength, and tear resistance.

I have discovered that it is distinctly advantageous to blend cellulose fiber of one solution viscosity with cellulose fiber of lower solution viscosity, especially when the fiber of lower solution viscosity has been physically and chemically degraded by previous treatment in the attainment of the low solution viscosity characteristic. One of the important advantages of such blending resides in the fact that the product has a solution viscosity much lower than the calculated average or mean value of its components, based on their solution viscosity and their proportions. For instance, a blend or mixture comprising 50% of each component has a solution viscosity far less than the arithmetic mean or average solution viscosity of the two components. An important advantage of such blending is that the fiber of higher solution viscosity, being physically undegraded, makes possible the sheeting of the blend into boards or papers which are not so dense or crumbly as to give rise to difficulties upon consequent conversion into esters. About 20% to 50% of long fiber of higher solution viscosity, based on the blend, for instance, the unhydrolyzed fiber hereinafter mentioned having a solution viscosity of about 5, is usually ample to permit the formation of satisfactory boards or sheets from the blend on machinery of the papermaking type. It is of course possible to use fibers of higher solution viscosity for this purpose, as such fibers possess the requisite physical and chemical characteristics.

There are various ways of applying the principles of the present invention, using various kinds of fibers of one solution viscosity and of lower solution viscosity. For instance, the fiber of lower solution viscosity may be of wood origin, whereas the fiber of higher solution viscosity may be relatively long, such as cotton or linen, particularly when the blend is to be formed into thick sheets or papers having good strength and tear resistance characteristics. If desired, the fiber of lower solution viscosity may be produced as by causing hydrolysis of cellulose fiber through the action of comparatively dilute or mild acid solutions at elevated temperature, and, if desired, under pressure, or through the action of comparatively concentrated or strong acid solution at low temperature, for instance, room temperature. The fiber subjected to hydrolysis may be one which has previously been mercerized, as mercerized fiber lends itself to relatively facile lowering of its solution viscosity by hydrolysis. The fiber of higher solution viscosity may be in mercerized or in unmercerized condition, although when nitrocellulose is to be the ester prepared from the blend, it may be preferable to use a mercerized fiber as the component of higher solution viscosity, because of the higher grade nitrocellulose obtainable therefrom. The fiber of higher solution viscosity may be one which, too, has undergone some hydrolysis or other solution-viscosity-lowering treatment short of effecting injury to the fiber or of reducing its solution viscosity to a value anywhere nearly as low as that of the component of low solution viscosity. It is, of course, possible to use fibers of low solution viscosity produced by the use of oxidizing or other agents. In fact, my blend may comprise more than two components of different solution viscosities and of different origins. The blend may be in bulk form, as when shredded, or in the form of thick sheets or papers. The component of higher solution viscosity may be in mercerized condition to advantage in the case of a bulk blend to be converted as such into esters, but when sheets or papers are to be made from the blend, it may be desirable to beat or hydrate the component of higher solution viscosity, in which case it is preferably in unmercerized condition to permit such hydration. The component of higher solution viscosity may be hydrated separately in the beater engine and the component of lower solution viscosity then added thereto, or the blend as a whole may be beaten prior to delivery to the paper-making machines. In any event, the fiber of higher solution viscosity imparts strength and tear resistance to the resulting sheets or papers formed from the blend; and the fiber of lower solution viscosity, when degraded to the point of being of short length and powders, serves as an excellent filler in the sheets or papers.

The solution viscosity of the resulting blend may be as high as from 4 to 10, especially in those cases where a fiber of high solution viscosity and high strength has been blended in substantial amount with a fiber of low solution viscosity. A blend of this type having a solution viscosity of, say 6, when converted into soda cellulose and subjected to comparatively mild ageing, may be xanthatable into viscose syrup from which rayons and films of excellent characteristics may be produced. On the other hand, blends having a solution viscosity below 1 may be produced by blending as much as 50% or more of a cellulose fiber having a solution viscosity of, say, about 5, with hydrolyzed fiber of very low solution viscosity.

On the accompanying drawing, I have shown two curves illustrating the effect on solution viscosity of blending unhydrolyzed fibers of solution viscosities of about 5 with hydrolyzed fibers of a solution viscosity of about 0.3. The dark curve represents what happens to the solution viscosity when an unhydrolyzed fiber is blended with a hydrolyzed fiber, and the light curve represents what happens to the solution viscosity when similar unhydrolyzed but mercerized fiber is blended with similar hydrolyzed fiber. It is to be observed that in a blend comprising 50% each of the two components, rather than obtaining a mean or average value of the solution viscosities of the two components amounting to about 2.0, it is found that a solution viscosity below 0.5 is realized. The fiber employed as raw material in ascertaining the solution viscosities values depicted by the curves, was a white wood fiber of high alpha-cellulose content, but such fiber is more or less representative of what takes place in the case of fibers of other origins.

The term "solution viscosity" as herein applied to cellulose fiber is an arbitrary one, being indicative of the viscosity of a cellulose ester solution preparable therefrom. The solution usually employed as a standard is a cuprammonium cellulose solution of prescribed cellulose concentration, the viscosity being determined by measuring the time of efflux of a definite volume of such solution under standard conditions, through an orifice of standard size. The solution viscosity of fiber is herein given in absolute c. g. s. units, and is determined by measuring the viscosity of a solution of 6 grams of fiber in a cuprammonium cellulose solution composed of 225 cc. of 28% ammonia water containing 9 grams of cuprous oxide. The c. g. s. unit is employed because it is definite, denoting a viscosity 100 times that of water at 20° C., wherefore a cuprammonium cellulose solution of standard composition identifying a fiber as having a solution viscosity of 10 is 1000 times as viscous as water at 20° C. Glycerine, which is often referred to when dealing with the solution viscosity of cellulose fiber, for example, has a value of between 8 and 10 units.

What I claim is:

1. A process which comprises hydrolyzing cellulose fiber to lower its solution viscosity to below 1, blending the hydrolyzed fiber with about 20% to 50%, based on the weight of the blend, of substantially unhydrolyzed cellulose fiber, and converting the blend into cellulose esters.

2. A process which comprises treating cellulose fiber with an oxidizing agent to lower the solution viscosity of such fiber to below 1, blending the resulting product with about 20% to 50%, based on the weight of the blend, of cellulose fiber having a solution viscosity of at least about 5 and converting the resulting blend into cellulose esters.

3. A cellulose product whose solution viscosity is less than 1 and consisting of a blend of hydrolyzed cellulose fiber of a solution viscosity below 1 and about 20% to 50%, based on the weight of the blend, of substantially unhydrolyzed cellulose fiber of a solution viscosity of at least about 5.

4. A cellulose product whose solution viscosity is less than 1 and consisting of a blend of an oxidized cellulose fiber of a solution viscosity below 1 and about 20% to 50%, based on the weight of the blend, of comparatively non-oxidized cellulose fiber of a solution viscosity of at least about 5.

5. A cellulose product whose solution viscosity is less than 1 and consisting of a blend of a crumbly cellulose fiber of a solution viscosity below 1 and about 20% to 50%, based on the weight of the blend, of much stronger cellulose fiber of a solution viscosity of at least about 5.

6. A cellulose product whose solution viscosity is less than 1 and consisting of a blend of cellulose fiber of a solution viscosity below 1 and about 20% to 50%, based on the weight of the blend, of mercerized cellulose fiber of a solution viscosity of at least about 5.

7. A cellulose product whose solution viscosity is less than 1 and consisting of a blend of hydrolyzed fiber of a solution viscosity below 1 and about 20% to 50%, based on the weight of the blend, of mercerized cellulose fiber of a solution viscosity of at least about 5.

8. A cellulose product whose solution viscosity is less than 1 and consisting of a blend of cellulose fiber of a solution viscosity less than 1 and about 20% to 50%, based on the weight of the blend, of cellulose fiber of a solution viscosity of at least about 5.

9. A cellulose sheet whose solution viscosity is less than 1 and consisting of a blend of powdery cellulose fiber of a solution viscosity below 1 and about 20% to 50%, based on the weight of the blend, of much stronger cellulose fiber of a solution viscosity of at least about 5.

10. A cellulose sheet whose solution viscosity is less than 1 and consisting of a blend of comparatively weak wood fibers of a solution viscosity below 1 and about 20% to 50%, based on the weight of the blend, of longer fibers of a solution viscosity of at least about 5.

11. A cellulose sheet whose solution viscosity is less than 1 and consisting of a blend of comparatively weak wood fibers of a solution viscosity below 1 and about 20% to 50%, based on the weight of the blend, of cotton fiber of a solution viscosity of at least about 5.

12. A process which comprises treating cellulose fiber with chemicals of the nature of acids and oxidizing agents to lower its solution viscosity to a value below 1, blending the resulting product with about 20% to 50%, based on the weight of the blend, of fiber of a solution viscosity of at least about 5, and converting the blend into cellulose esters.

13. A product consisting of a blend of cellulose fiber whose solution viscosity is at least about 5 and about 50% by weight of cellulose fiber whose solution viscosity is less than 0.5.

GEORGE A. RICHTER.